UNITED STATES PATENT OFFICE.

CHARLES NETTLETON, OF DES MOINES, IOWA.

BOILER-CLEANING COMPOSITION.

SPECIFICATION forming part of Letters Patent No. 711,876, dated October 21, 1902.

Application filed July 5, 1902. Serial No. 114,522. (No specimens.)

*To all whom it may concern:*

Be it known that I, CHARLES NETTLETON, a citizen of the United States, residing at Des Moines, in the county of Polk and State of Iowa, have invented a new and useful Composition of Matter to be Used as a Boiler-Cleaner and for Preventing the Incrustation of Steam-Boilers and also for Purifying Water, of which the following is a specification.

My composition consists of the following ingredients combined in the proportions stated: Glauber salt, eighty-six pounds; soda-ash, one hundred pounds; sulfate of lime, ten pounds; slippery-elm, four pounds. These ingredients are all comminuted and thoroughly mingled by agitation in a vessel or in any suitable way and put up dry in suitable packages for transportation, storing, and selling.

In using my above-named composition one pound a day placed in a steam-boiler generator of seventy-five-horse power will be adequate to prevent incrustation and damage by scaling. The slippery-elm, practically wooden sawdust, will absorb matter in the water that would naturally gather and adhere on the surface of the boiler after it is separated and precipitated by the other ingredients, so that foreign substances and impurities in the water can be readily removed from the boiler with the wood by steam-pressure or in any suitable way as required for cleaning the boiler.

What I claim, and desire to secure by Letters Patent of the United States, is—

The herein-described composition of matter, Glauber salt, soda-ash, sulfate of lime and slippery-elm, substantially as described and for the purposes stated.

In testimony whereof I have signed my name to this specification in the presence of two subscribing witnesses.

CHARLES NETTLETON.

Witnesses:
R. H. ORWIG,
THOMAS G. ORWIG.